United States Patent [19]

Miyakawa

[11] Patent Number: 4,862,285
[45] Date of Patent: Aug. 29, 1989

[54] METHOD OF CHANGING IMAGE MAGNIFICATION

[75] Inventor: Tadashi Miyakawa, Kanagawa, Japan

[73] Assignee: Fuji Photo Film Co., Ltd., Kanagawa, Japan

[21] Appl. No.: 81,512

[22] Filed: Aug. 5, 1987

[30] Foreign Application Priority Data

Aug. 13, 1986 [JP] Japan .................. 61-190778

[51] Int. Cl.$^4$ .............................................. H04N 1/04
[52] U.S. Cl. ........................................ 358/451; 358/77
[58] Field of Search ................... 358/287, 285, 77

[56] References Cited

U.S. PATENT DOCUMENTS

| | | | |
|---|---|---|---|
| 4,275,450 | 6/1981 | Potter ............................. | 358/77 X |
| 4,595,958 | 6/1986 | Anderson, Jr. et al. ......... | 358/77 X |
| 4,610,026 | 9/1986 | Tabata et al. .................... | 358/287 X |
| 4,651,223 | 3/1987 | Sasaki et al. .................... | 358/287 X |
| 4,683,501 | 7/1987 | Carena et al. ................... | 358/293 |
| 4,712,141 | 12/1987 | Tomohisa et al. .............. | 358/287 X |
| 4,724,330 | 2/1988 | Tuhro ............................. | 358/293 X |
| 4,734,785 | 3/1988 | Takei et al. ...................... | 358/287 X |
| 4,743,963 | 5/1988 | Abuyama ........................ | 358/287 X |
| 4,771,473 | 9/1988 | Sugiura ........................... | 358/287 X |
| 4,774,581 | 9/1988 | Shiratsuchi ..................... | 358/287 X |

FOREIGN PATENT DOCUMENTS 57-002038  1/1982  Japan ................................. 358/77

OTHER PUBLICATIONS

Henry Liao, "A 2X Magnification Technique", Xerox Disclosure Journal, vol. 5 #3, May/Jun. 1980, pp. 295–296.

*Primary Examiner*—Edward L. Coles, Sr.
*Attorney, Agent, or Firm*—Sughrue, Mion, Zinn, Macpeak & Seas

[57] ABSTRACT

The magnification ratio of image information carried on an original is changed for reproduction at a desired magnification ratio. The size of the image information is reduced or enlarged to a prescribed size by an optical system. Thereafter, the image information is photoelectrically converted by a light sensor. The photoelectrically converted image information is selectively picked up or data between adjacent items of the photoelectrically converted image information is determined by interpolation, thereby obtaining image information at a desired size.

5 Claims, 6 Drawing Sheets

FIG.4

| COMBINED MAGNIFICATION | OPTICAL MAGNIFICATION | ELECTRICAL MAGNIFICATION |
|---|---|---|
| 100% | 100% | 100% |
| 101 | 101 | 100 |
| 102 | 102 | 100 |
| ⋮ | ⋮ | ⋮ |
| 199 | 199 | 100 |
| 200 | 100 | 200 |
| 202 | 101 | 200 |
| ⋮ | ⋮ | ⋮ |
| 400 | 200 | 200 |
| 402 | 134 | 300 |
| 405 | 135 | 300 |
| ⋮ | ⋮ | ⋮ |
| 450 | 150 | 300 |
| ⋮ | ⋮ | ⋮ |
| 600 | 200 | 300 |

| $D_{N+1}-D_N=$ | $i=0$ | $i=1$ | $i=2$ |
|---|---|---|---|
| 255 | 0 | 85 | 170 |
| 254 | 0 | 84 | 169 |
| 253 | 0 | 84 | 168 |
| q−p | 0 | $(q-p)/3$ | $2(q-p)/3$ |
|  | 0 | −84 | −169 |
| −255 | 0 | −85 | −170 |

54

METHOD OF CHANGING IMAGE MAGNIFICATION

BACKGROUND OF THE INVENTION

The present invention relates to a method of changing image magnification, and more particularly to a method of enlarging or reducing image information produced from a light sensor after it has read an original image as modified in size by optical means, at a desired magnification ratio with electric means, so that an image which is magnified at a desired ratio can be reproduced highly accurately and inexpensively.

In the field of printing plate-making, for example, there has been employed an image scanning recording and reproducing system for electrically processing image information on an original to produce an original film plate in order to carry out the plate-making process efficiently and improving the image quality.

The image scanning recording and reproducing system is basically composed of an image reading device and an image reproducing device. In the image reading device, image information on an original which is fed in an auxiliary scanning direction is scanned in a main scanning direction by a light sensor, which converts the image information to an electric signal. Then, the photoelectrically converted image information is subjected to gradation correction, profile emphasis, and other image processing in the image reproducing device according to given plate-making conditions. Thereafter, the image information is converted to a light signal such as a laser beam signal which is applied to a recording medium comprising a photosensitive material such as a photographic film to record the image information thereon. The image on the recording medium is developed by an image developing device, and the recording medium will be used as a film plate in a printing process.

It is preferable that the image information carried on the original be reproduced at an enlarged or reduced size by selecting a desired magnification ratio. One method of changing the magnification ratio of image information is to use a zoom lens in the optical system for focusing the image information on the light sensor and vary the magnification ratio by operating the zoom lens.

A magnification ratio for image information can be changed as desired by the zoom lens. However, where image information is greatly enlarged by the zoom lens, the image information focused on the light sensor suffers from various optical defects such as spherical aberration, distortion, and the like, resulting in a reduction image accuracy. It would be technically difficult and highly expensive to produce a zoom lens having minimum aberrations and capable of magnifying image information in a wide magnification range.

It is also possible to employ a fixed-focus lens, instead of a zoom lens, and to displace the fixed-focus lens and the light sensor with respect to an original for thereby changing the magnification ratio.

With this method, however, the lens and the light sensor must be displaced greatly in order to greatly enlarge or reduce the original image, and a wide space is necessary to accommodate such a large displacement of the lens and the light sensor. Where the magnification of the original image is increased, optical defects or aberrations are produced to lower the image accuracy, as with the zoom lens.

An electric process may be employed for changing an image magnification ratio. For example, image information photoelectrically converted by a light sensor and stored in a memory may be reproduced in a $\frac{1}{2}$ size by reading the stored information from every other address of the memory. Likewise, stored image information may be reproduced in a reduced size at a magnification ratio of $\frac{1}{3}$, $\frac{1}{4}$, . . . Conversely, an image may be reproduced at a magnification ratio which is a multiple of an integer by reading image information several times from each address of the memory.

It is however impossible to continuously change the magnification ratio to obtain magnification of x 1.3 or x 3.8, for example, since available magnification ratios are multiples of an integer. An enlarged reproduced image is not smooth and continuous because it is reproduced by reading the stored information several times from each address of the memory.

SUMMARY OF THE INVENTION

It is an object of the present invention to provide a method of changing the magnification ratio of an image by reading, with a light sensor, an original image produced at a desired size by optical means, changing the magnification of the image from the light sensor with electric means to produce an image signal at a desired size, so that an image which is magnified in a wide magnification range can be reproduced highly accurately and inexpensively.

Another object of the present invention is to provide a method of changing the magnification ratio of image information carried on an original for reproduction at a desired magnification ratio, the method comprising the steps of reducing or enlarging the image information to a prescribed size with optical means, thereafter, photoelectrically converting the image information with a light sensor, and selectively picking up the photoelectrically converted image information or determining data between adjacent items of the photoelectrically converted image information by interpolation, thereby obtaining image information at a desired size.

Still another object of the present invention is to provide a method of changing the magnification ratio of image information, wherein the optical means comprises a fixed-focus lens, the light sensor and the fixed-focus lens being displaceable with respect to the original to change the magnification ratio of the image information with respect to the light sensor.

Yet another object of the present invention is to provide a method of changing the magnification ratio of image information, wherein the optical means comprises a zoom lens for changing the magnification ratio of the image information with respect to the light sensor.

A further object of the present invention is to provide a method of changing the magnification ratio of image information, wherein magnification ratios established by the optical means and magnification ratios established by the electric means are stored in combination in a magnification table.

A yet further object of the present invention is to provide a method of changing the magnification ratio of image information, wherein the data between the adjacent items of the photoelectrically converted image information is produced by using an interpolation table set up according to enlarging magnification ratios established by the electric means.

A still further object of the present invention is to provide a method of changing the magnification ratio of image information, wherein the interpolation table is composed of interpolated data produced for each of the magnification ratios established by the electric means, the interpolated data being selected according to an enlarging magnification ratio established by the electric means to interpolate the image information.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a view showing a magnification table produced in the method of the invention;

FIG. 5 is a view of an interpolation table produced in the method of the invention.

DESCRIPTION OF THE PREFERRED EMBODIMENT

Figure 1:
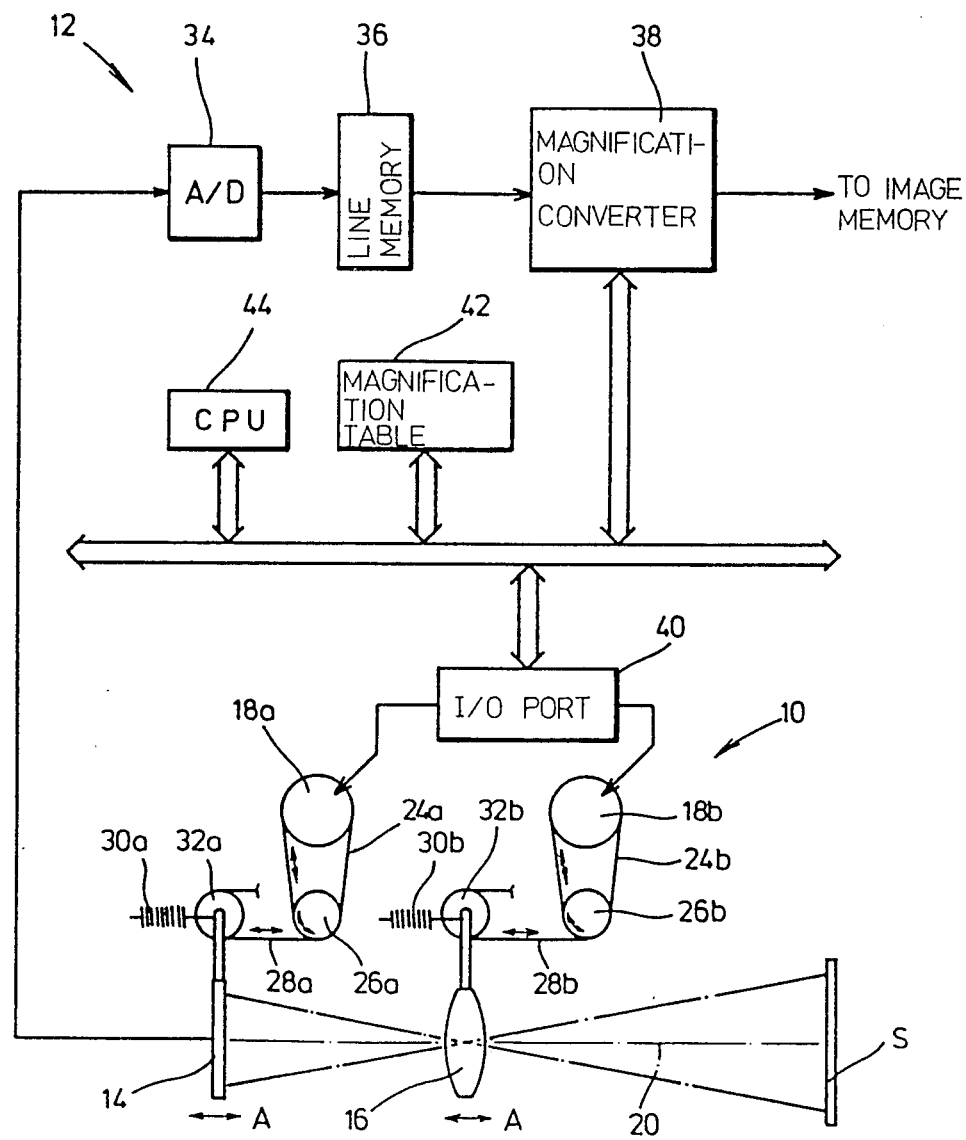
FIG. 1 is a schematic view, partly in block form, of an image reading device which employs a method of changing the magnification ratio of an image according to the present invention.

FIG. 1 shows an image reading device in which a method of changing the magnification ratio of an image according to the present invention is carried out. The image reading device essentially comprises an image reader 10 for optically reading image information carried on an original S and an image processor 12 for electrically processing the image information read by the image reader 10.

Figure 2:
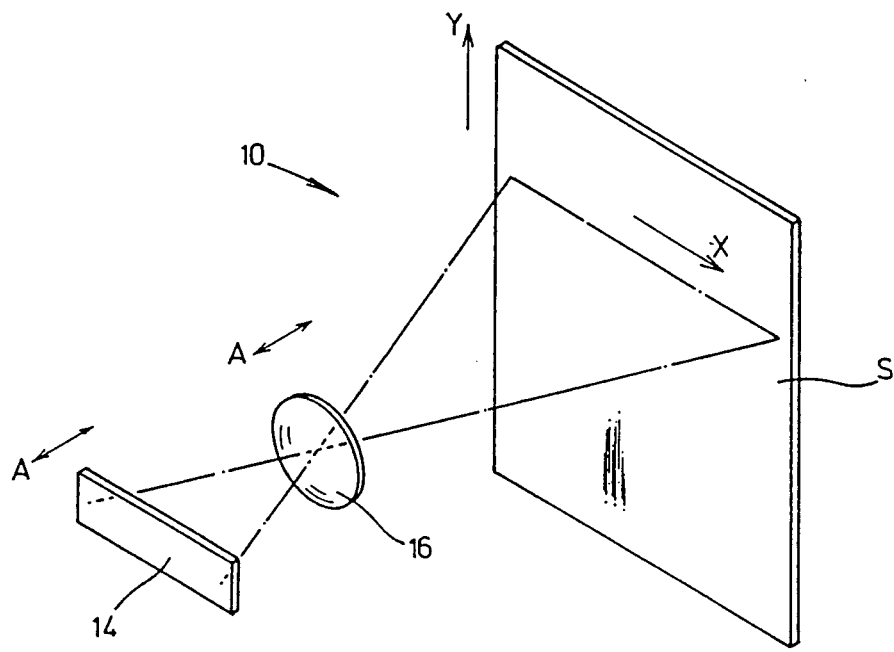
FIG. 2 is a perspective view of the image reading device shown in FIG. 1.

The image reader 10 includes a light sensor 14 in the form of a CCD for photoelectrically converting light from the image information carried on the original S, and a fixed-focus lens 16 for focusing the image information at a varied magnification ratio on the CCD 14. The CCD 14 comprises a linear array of photoelectric transducer elements, and is disposed parallel to a main scanning direction indicated by the arrow X (FIG. 2) for the original S to scan the original S which is fed in an auxiliary scanning direction indicated by the arrow Y.

The CCD 14 is displaceable by a step motor 18a to move along an optical axis 20 of the lens 16. More specifically, the step motor 18a is operatively coupled to a drum 26a through a belt 24a. A wire 28a has one end wound around the drum 26a and an opposite end fixed to the frame of the image reader 10 and trained around a pulley 32a which is urged by a spring 30a to move in a direction away from the drum 26a, the pulley 32a being fixed to the CCD 14.

The lens 16 is displaceable by a step motor 18b in a direction along the optical axis 20. Rotative drive power from the step motor 18b is transmitted to the lens 16 by a mechanism which is identical to the power transmitting mechanism associated with the CCD 14. Therefore, various parts of the power transmitting mechanism associated with the lens 16 are denoted by identical reference numerals with a suffix b and will not be described in detail. The magnification ratio of image information focused on the CCD 14 is optically variable by displacing the CCD 14 and the lens 16 along the optical axis 20 with the step motors 18a, 18b.

The image processor 12 comprises an A/D converter 34 for converting the image information which has been photoelectrically converted by the CCD 14 to a digital signal, a line memory 36 serving as a buffer for temporarily storing the digital image information from the A/D converter 34, a magnification converter 38 for electrically processing the image information to change its magnification, an I/O port 40 for applying control signals to the step motors 18a, 18b of the image reader 10, and a magnification table 42 containing selected combinations of magnification ratios. These components of the image processor 12 are controlled by a CPU 44. The magnification table 42 contains magnification ratios that can be varied by the image reader 10 and magnification ratios that can be varied by the magnification converter 38 in combination with desired magnification ratios for image information.

Figure 3:
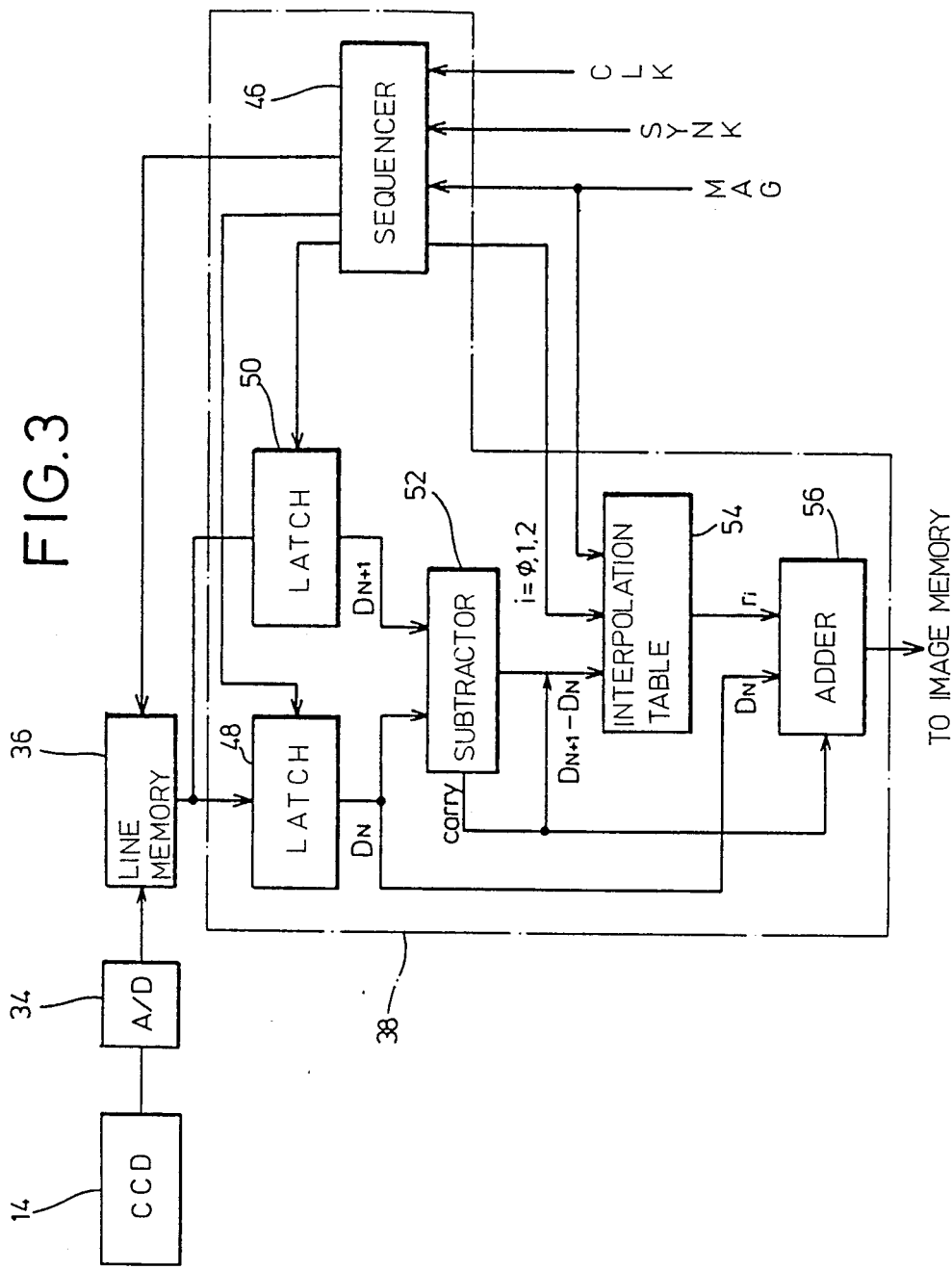
FIG. 3 is a block diagram of a magnification converting circuit shown in FIG. 1.
Figure 6:
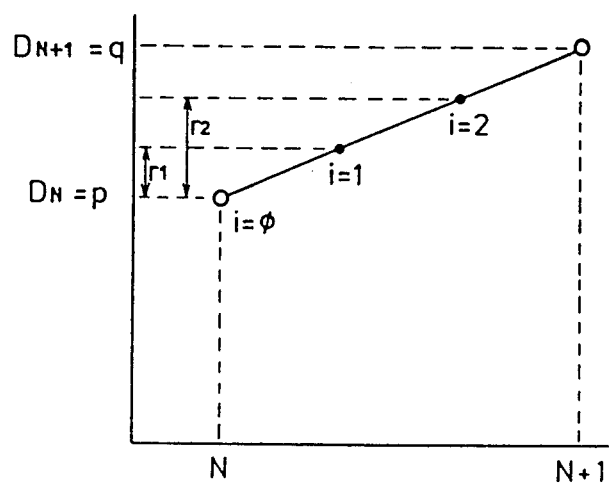
FIG. 6 is a diagram illustrating linear interpolation effected in the method of the invention.

The magnification converter 38 is arranged as shown in FIG. 3. The magnification converter 38 comprises a sequencer 46 for controlling an operation sequence of the magnification converter 38, a pair of latches 48, 50 for latching image data items fetched from the line memory 36 based on an addressing command from the sequencer 46, a subtractor 52 for calculating the difference between the image data items latched in the latches 48, 50, an interpolation table 54 for producing interpolated data based on the difference calculated by the subtractor 52, and an adder 56 for adding the image data latched in the latch 48 and the interpolated data and applying the sum data to an image memory (not shown). The interpolation table 54 stores linear interpolation data items with respect to predicted values for the calculated data from the subtractor 52, in association with the magnification ratios in the magnification converter 38.

A method of changing the magnification ratio of an image is carried out by the above arrangement as follows:

A magnification ratio for image information carried on the original S is expressed as the product of a magnification ratio optically established in the image reader 10 and a magnification ratio electrically established by the magnification converter 38 of the image processor 12. Assuming that the image reader 10 has a range of magnification ratios of from 100% to 200% in increments of 1% and the magnification converter 38 can establish magnification ratios of 100%, 200%, and 300%, combined magnification ratios for a reproduced image are as shown in FIG. 4. The combined magnifications range from 100% to 600% in increments of 1 through 3%. These combinations of magnification ratios are stored as the magnification table 42 in a memory. The combinations of the magnification ratios established in the image reader 10 and the magnification ratios established in the magnification converter 38 are selected such that the quality of reproduced images will be optimum.

A magnification ratio is converted by the magnification converter 38 based on the interpolation table 54. The interpolation table 54 is set up as illustrated in FIG. 5 assuming that the magnification ratio established by the magnification converter 38 is 300%. If image data is represented by 8 bits, the image data can be expressed by 256 level. Assuming that the Nth image data is indicated by $D_N$ and the (N+1)th image data adjacent to the Nth image data is indicated by $D_{N+1}$, the value of $(D_{N+1}-D_N)$ can be expressed by 511 levels from $-255$ to 255. In order to obtain image data which is magnified at a magnification ratio of 300%, the interval between the Nth image data $D_N$ and the (N+1)th image data $D_{N+1}$ is divided into three segments and interpolated data $r_i$ (i=0, 1, 2) with respect to the image data $D_N$ at points of division i (i=0, 1, 2) is obtained by linear interpolation. The deviation of the interpolated data item $r_0$ from the image data is zero. Where the image data $D_N$ is represented by p and the image data $D_{N+1}$ is represented by q, the interpolated data items $r_1$, $r_2$ are expressed as follows:

$$r_1 = (q-p)/3 \quad (1)$$

$$r_2 = 2(q-p)/3 \quad (2)$$

An interpolation table 54 with respect to the magnification ratio of 300% is prepared in this manner and stored in the memory. Likewise, interpolation tables 54 with respect to magnification ratios of 100%, 200% are prepared in the same manner. As the interpolation table for the magnification ratio of 100%, the interpolation table for the magnification table of 200% or the interpolation table 54 for the magnification table of 300% with i=1 may be used.

After the magnification table 42 and the interpolation table 54 have been prepared, the original S is scanned to produce image data at a desired magnification ratio. By way of example, image information is magnified 150% by the image reader 10 and then magnified 300% by the magnification converter 38, so that image information is reproduced at a combined magnification of 450%.

First, desired magnification data 450% is applied from an input device (not shown) to the image processor 12. The image processor 12 then selects a magnification ratio of 150% optically established by the image reader 10 and a magnification ratio of 300% electrically established by the magnification converter 38, from the magnification table 42 (FIG. 4). Then, the CPU 44 applies a control signal corresponding to the magnification ratio of 150% established by the image reader 10 to the step motors 18a, 18b through the I/O port 40. In response to the applied control signal, the step motors 18a, 18b rotate the drums 26a, 26b through the respective belts 24a, 24b to displace the respective wires 28a, 28b in directions of the arrows. Since the wires 28a, 28b are trained around the respective pulleys 32a, 32b, the CCD 14 and the lens 16 are displaced by the pulleys 32a, 32b in the directions of the arrows A. As a result, the conjugate lengths between the CCD 14 and the lens 16 and between the lens 16 and the original S are varied to focus the image information carried by the original S onto the CCD 14 at the magnification ratio of 150%.

The image information which is photoelectrically converted by the CCD 14 is converted by the A/D converter 34 to a digital signal which is stored in the line memory 36.

The sequencer 46 of the magnification converter 38 is supplied with a clock signal, a synchronizing signal, and a magnification signal in timed relation to the image scanning operation effected by the CCD 14. As the magnification signal, a magnification signal indicative of 300% established by the magnification table 42 shown in FIG. 4 is applied. The sequencer 46 then specifies data addresses of the line memory 36 based on the clock signal. The line memory 36 thus addressed by the sequencer 46 supplies Nth image data $D_N$ to the latch 48 and also supplies (N+1)th image data $D_{N+1}$. The image data items $D_N$, $D_{N+1}$ latched by the respective latches 48, 50 are then supplied to the subtractor 52 which then calculates their difference according to $(D_{N+1}-D_N)$.

A prescribed interpolation table 54 is selected on the basis of the magnification signal which is established by the magnification table 42 for the magnification converter 38. At this time, the interpolation table 54 with respect to 300% as shown in FIG. 5 is selected. In the interpolation table 54, levels corresponding to the difference $(D_{N+1}-D_N)$ calculated by the subtractor 52 are selected, and interpolated data items $r_i$ (i=0, 1, 2) at these levels are successively indicated by the sequencer 46 and applied to the adder 56.

The adder 56 adds the image data $D_N$ from the latch 48 and the interpolated data items $r_i$ (i=0, 1, 2). As a result, two new image data items are produced between the image data $D_N$, $D_{N+1}$.

In the above manner, the image information of the original S is enlarged 150% by the lens 16 of the image reader 10, and thereafter enlarged 300% by the magnification converter 38. As a consequence, the image information is enlarged 450% and stored in the image memory. The enlarged image information is then supplied to an image reproducing device in which is reproduced highly accurately without optical defects or aberrations.

While in the above embodiment image information is obtained at the magnification ratio of 450%, image information may be obtained at other magnification ratios that can be established by the magnification table 42. The magnification table 42 is shown as having combined magnification ratios of 100% or larger. However, it is easy to obtain image information at a combined magnification ranging from 50% to 100%. For example, in order to have a combined magnification ratio of 50%, image information may be reduced 50% in size by the optical means, or the magnification ratio according to the optical means may be selected to be 100%, and every other image data may be selected by the electric means for storage in the image memory.

With the arrangement of the present invention, as described above, an original image is reduced or enlarged in size by optical means, and read by a photoelectric transducer device, and then magnified image information from the photoelectric transducer device is selectively picked up or data between image information items are interpolated by electric means, so that image information can be obtained at a desired magnification ratio. Accordingly, image information can be reduced or enlarged highly accurately without optical defects or aberrations in a wide range of magnification ratios. The arrangement required to perform the above method is inexpensive since an expensive zoom lens is not employed as optical means to change magnification ratios. When image information is enlarged, image data between adjacent pixels of the original image is produced by linear interpolation. Therefore, a smooth enlarged image of continuous gradation can be reproduced at a large magnification ratio.

The drive system or mechanism in the image reader 10 may be simplified by employing a relatively inexpensive zoom lens in place of the fixed-focus lens 16.

Although a certain preferred embodiment has been shown and described, it should be understood that many changes and modifications may be made therein without departing from the scope of the appended claims.

What is claimed is:

1. A method of changing a magnification ratio of image information produced from an original for reproduction at a desired magnification ratio, said method comprising the steps of:

optically resolving said image information by performing one of a reducing and enlarging of said image information to a prescribed size with optical means;

thereafter, photoelectrically converting said image information with a light sensor; and selectively picking up the photoelectrically converted image information and utilizing interpolation means for determining data between adjacent items of the photoelectrically converted image information by interpolation, thereby obtaining image information at a desired size wherein, for each respective one of a plurality of desired magnification ratios, a magnification ratio to be established by said optical means and a corresponding magnification ratio to be established by said interpolation means to produce said image information at a desired magnification ratio are stored in combination in a magnification table.

2. A method according to claim 1, wherein said optical means comprises a fixed-focus lens, said light sensor and said fixed-focus lens being displaceable with respect to the original to change the magnification ratio of the image information with respect to said light sensor.

3. A method according to claim 1, wherein said optical means comprises a zoom lens for changing the magnification ratio of the image information with respect to said light sensor.

4. A method according to claim 1, wherein the data between adjacent items of said photoelectrically converted image information is produced by using an interpolation table set up according to enlarging ratios established by said interpolation means.

5. A method according to claim 4, wherein said interpolation table is composed of interpolated data produced for each of the magnification ratios established by said interpolation means, said interpolated data being selected according to an enlarging magnification ratio established by said interpolation means to interpolate the image information.

* * * * *